UNITED STATES PATENT OFFICE.

CHARLES B. STOWE, OF LAKEWOOD, OHIO.

PROCESS FOR MAKING REFRACTORY MATERIALS.

1,205,056.   Specification of Letters Patent.   Patented Nov. 14, 1916.

No Drawing.   Application filed October 6, 1916.   Serial No. 124,034.

*To all whom it may concern:*

Be it known that I, CHARLES B. STOWE, a citizen of the United States, residing at Lakewood, in the county of Cuyahoga and State of Ohio, have invented certain new and useful Improvements in Processes for Making Refractory Materials, of which the following is a specification.

My invention relates more particularly to basic refractories and processes for making them, and its principal object is to produce by artificial processes refractories of this character which possess qualities superior to those heretofore obtainable, chiefly from natural deposits.

In the construction of furnaces for melting metals, and for other metallurgical processes, various refractory materials are in use, the choice of such materials depending upon the kind of metal which is to be treated in the furnace, and the temperature which it is necessary for the furnace to attain.

For the high temperatures required for the proper boiling of steel, copper or other metals, furnace linings, whether built of brick or of bulk grain material formed into linings in the furnace, magnesite (magnesium carbonate) and chromium rock, containing a percentage of iron, or, a co-mixture of magnesium and calcium carbonates in the form of stone commonly called dolomite, are extensively used. At certain temperatures attained in metallurgical furnaces these materials, if they contain no iron and are used alone in the furnace linings, are attacked by molten slag and iron and rapidly melt away. A further objection to the use of these materials uncombined with iron in furnace linings is their extreme friability and lack of mechanical strength at high temperatures. If, however, the magnesia has been chemically combined with iron or iron oxid, before being used in the furnace lining, it will resist the chemical and mechanical corrosive actions of the molten metal and fluxes melted in contact with it, due to its chemical affinity for these substances having been satisfied, and due also to an increase in its mechanical strength.

It has been found that certain natural magnesium bearing rocks, usually found in the form of carbonates, containing iron or iron oxid, when calcined to drive off the carbonic acid gas, $CO_2$, form suitable refractory materials for the lining of metallurgical furnaces. It has also been proposed to form somewhat similar refractory materials by artificially combining at high temperatures, natural magnesite, containing little or no iron or iron oxid, with iron oxid and silica. Such a product and the process of making it are disclosed in U. S. Patent, No. 792,882, to Davison.

Due to the relatively low cost of the natural magnesium bearing rocks which contain suitable percentages of iron, it has been customary heretofore, to employ for these high refractories only such materials as have been obtainable from natural deposits, such as Austrian magnesite which, after being calcined, contains from 5 per cent. to 10 per cent. of iron oxid, or Grecian magnesite which, after being calcined, contains up to 5 per cent. of iron oxid. There are but few known natural deposits of these iron bearing minerals and under conditions which sometimes exist, as during the present war in Europe, it is very difficult or even quite impossible to obtain them at any price. There are in this country and in Canada a number of deposits of magnesite which contain practically no iron. These minerals can be successfully used in my process.

In using the Austrian and Grecian magnesites, they have been sometimes combined with other refractories, but, on account of variations in the iron content of the materials, it has been difficult to produce uniformity in the resultant mixtures, and consequently the life of a furnace lining has been most uncertain.

In research work for materials which might be used as substitutes for the natural minerals heretofore used, I have discovered a process by which materials, similar in composition and in refractory qualities to the calcined, iron bearing, natural minerals, can be produced. Moreover, by my process the proportions of the various constituents can be governed to produce uniform resultant materials having predetermined characteristics, which cannot be readily produced from the natural, iron bearing minerals used as refractories, because of variations in the iron content of such natural minerals.

In carrying out my process, I prefer to employ natural magnesite which is practically free from iron content. With the magnesite I mix such a quantity of iron oxid in such form as hematite ore, rolling mill scale, or other form, as will give the desired iron content to the finished product, and grind the mixture, adding sufficient water to make the mass have the consistency of brick mud. This mud is next molded into brick or other form and dried until the molded forms are sufficiently hard to withstand the pressure of stacking. The brick when so dried are set in a kiln. Flues are formed through the set brick so that the hot furnace gases may heat all the brick uniformly. The brick thus stacked are burned in the kiln at a suitable temperature and for sufficient time to drive off the carbonic acid gas and water from them and to cause the magnesia and iron oxid to unite. The product of this treatment has the characteristics of and I believe it to be the mineral known as magnesioferrite, $MgOFe_2O_3$. The formation of this mineral may not be entirely completed throughout the whole mass of material in one burning, but, from the results I have secured in carrying out my process, there can be no doubt that there is a union of magnesium oxid and iron oxid. I have been able to produce satisfactory material by firing a kiln full of brick for nine days and then allowing it to cool for five days. The temperature attained in the kiln is between the melting points of No. 11 and No. 19, Seger pyrometric cones. The absorption of iron oxid by the magnesia seems to be assisted by maintaining a temperature within these limits for from thirty-six to forty-eight hours. After this first burning, the brick are removed and crushed. The crushed material at this stage of my process is perfectly suitable for use as grain material for making furnace linings. Or, it may be mixed with new raw materials, magnesite, magnesia, or iron oxid, to give any desired relative proportions of magnesia and iron oxid in the resultant refractory and retreated in the same manner as in the first process above described.

It is to be noted that upon the relative proportions of magnesia and iron oxid in the mixture depends the temperature which the refractory will withstand. The smaller the amount of iron oxid, the higher will be the melting point, and, the larger the amount of iron oxid, the lower will be the melting point of the resultant refractory. The smaller the amount of iron oxid, the more friable becomes the refractory, and it is therefore advisable to choose for a furnace lining a refractory material having a melting point only slightly higher than the temperature which the furnace will attain. It will be seen that by my proces the proportions of magnesia and iron oxid can be accurately governed to produce refractories of any desired characteristics possible with these materials.

If the product of my process is to be made into brick or other molded shapes to be used for furnace linings, crucibles, thermit molding gates or other purposes, I have found it best to give the product of the first burning above described an additional treatment in order to slake any remaining unslaked lime that may be present as an impurity in the mixture and which, if not slaked, would cause the brick to crack. The additional treatment is as follows: The crushed brick from the first burning are ground with water and the mud formed is spread out on the floor to allow any small amount of unslaked lime which may be present in the mixture to slake, and to age the mud to produce better plasticity. The material is then ground again with water to the consistency of brick mud, and molded into brick or other shapes, which are partially dried and then repressed into accurate form. After this they are allowed to dry and harden so that they will withstand the pressure of being stacked, then they are set in kilns and burned at a temperature between the melting points of No. 12 and No. 20 Seger pyrometric cones and maintained at a high temperature long enough to cause the brick to become somewhat vitrified. The brick or other molded shapes produced by this process are hard and dense, and are not subject to further slaking or breaking either from exposure in air or under high temperatures of metallurgical furnaces.

It will be understood that any number of regrinding and reburning operations may be performed upon the materials and that such fresh materials as may be required to produce the desired ultimate product may be added between these operations. The result of regrinding and reburning is the production of denser and harder materials, more homogeneous in cross section than is the product of the previous grinding and burning. It will also be understood that the object of molding the materials into brick form for the first burning is to permit the materials to be placed in the kiln so that they may be uniformly heated and the kiln be economically filled and operated. So far as the uniting of magnesia with iron oxid is concerned, it is not necessary that the materials be molded into brick form before heating, but I have found that the depth of absorption or solution of iron oxid by magnesia is dependent upon the time for which the proper temperature is maintained, and that it is much more economical to treat large quantities of material in brick form than to treat them in bulk or grain form.

I claim as my invention:

1. The process of making a basic refractory which consists of mixing magnesium carbonate with iron oxid and heating the mixture to cause the magnesium carbonate to be reduced to magnesium oxid and absorb iron oxid of the mixture.

2. The process of making magnesioferrite which consists of mixing magnesium carbonate with iron oxid and heating the mixture to cause the chemical combination of magnesium oxid, MgO, with iron oxid $Fe_2O_3$ in the form of magnesioferrite $MgOFe_2O_3$.

3. The process of making a basic refractory which consists of making a brick mud by grinding magnesium carbonate, iron oxid and water together, forming the mud into bricks and burning the bricks to cause the water and carbon dioxid to be driven off and to cause magnesium oxid to unite with iron oxid of the mixture.

4. The process of making basic refractory bricks and other molded shapes which consists of making a brick mud by grinding magnesium carbonate, iron oxid and water together, forming the mud into bricks, burning the bricks to cause the water and carbon dioxid to be driven off and to cause magnesium oxid to unite with iron oxid of the mixture, then crushing the bricks, grinding the crushed brick with water to form a brick mud, forming the mud into bricks or other molded shapes and burning the molded shapes substantially as described.

In testimony whereof I affix my signature in the presence of two witnesses.

CHARLES B. STOWE.

Witnesses:
 CHAS. J. STEITZ,
 CHAS. W. KEPLINGER.